(12) United States Patent
Shi et al.

(10) Patent No.: US 12,156,133 B2
(45) Date of Patent: Nov. 26, 2024

(54) DISCONTINUOUS RECEPTION METHOD AND APPARATUS

(71) Applicant: GUANGDONG OPPO MOBILE TELECOMMUNICATIONS CORP., LTD., Dongguan (CN)

(72) Inventors: Cong Shi, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 317 days.

(21) Appl. No.: 17/561,994

(22) Filed: Dec. 26, 2021

(65) Prior Publication Data
US 2022/0124615 A1    Apr. 21, 2022

Related U.S. Application Data

(63) Continuation of application No. PCT/CN2019/094638, filed on Jul. 4, 2019.

(51) Int. Cl.
*H04W 52/02*    (2009.01)

(52) U.S. Cl.
CPC ... *H04W 52/0216* (2013.01); *H04W 52/0229* (2013.01)

(58) Field of Classification Search
None
See application file for complete search history.

(56) References Cited

U.S. PATENT DOCUMENTS

| 2010/0091693 | A1 | 4/2010 | Pelletier et al. |
| 2012/0275365 | A1* | 11/2012 | Anderson ........... H04W 68/025 370/311 |
| 2019/0239189 | A1* | 8/2019 | Hwang ............. H04W 52/0216 |
| 2019/0254110 | A1* | 8/2019 | He ..................... H04L 41/0896 |

(Continued)

FOREIGN PATENT DOCUMENTS

| CN | 103200653 A | 7/2013 |
| CN | 106604376 A | 4/2017 |

(Continued)

OTHER PUBLICATIONS

International Search Report issued in corresponding International Application No. PCT/CN2019/094638, mailed Mar. 25, 2020, 29 pages.

(Continued)

*Primary Examiner* — Jamaal Henson
(74) *Attorney, Agent, or Firm* — BAYES PLLC

(57) ABSTRACT

Embodiments of the present application provide a discontinuous reception (DRX) method including monitoring a first power consumption reduction signal, the first power consumption reduction signal being used for indicating whether to start a duration timer within a first period of time; and determining, according to a detection result of the first power consumption reduction signal, whether to start the duration timer. The first period of time is, for example, n DRX cycles, n being a positive integer greater than or equal to 1. When n is greater than 1, a network device can control, by sending a power consumption reduction signal, a terminal device to start or not start a duration timer within multiple DRX cycles.

8 Claims, 6 Drawing Sheets

(56) References Cited

U.S. PATENT DOCUMENTS

| | | | |
|---|---|---|---|
| 2020/0029302 A1* | 1/2020 | Cox | H04W 52/0216 |
| 2020/0077338 A1* | 3/2020 | Sui | H04W 52/0229 |
| 2020/0178172 A1* | 6/2020 | Thangarasa | H04W 76/28 |
| 2021/0176710 A1* | 6/2021 | Tooher | H04W 68/005 |
| 2021/0306952 A1* | 9/2021 | Kuang | H04L 69/28 |

FOREIGN PATENT DOCUMENTS

| | | | | |
|---|---|---|---|---|
| CN | 109219116 A | * | 1/2019 | H04L 69/28 |
| CN | 109561488 A | | 4/2019 | |

OTHER PUBLICATIONS

Written Opinion of the International Searching Authority issued in corresponding International Application No. PCT/CN2019/094638, mailed Mar. 25, 2020, 8 pages.

"3rd Generation Partnership Project; Technical Specification Group Radio Access Network; NR; Medium Access (Release 15)", 3GPP TS 38.321 V15.5.0 (Mar. 2019), 77 pages.

"DRX Command MAC Control Element", Agenda Item: 10.3.1.10 DRX, Source: ASUSTeK, 3GPP TSG-RAN2 Meeting #99 R2-1709321, Germany, Berlin, Aug. 21-25, 2017, 4 pages.

"3rd Generation Partnership Project; Technical Specification Group Radio Access Network; NR; Study on UE Power Saving (Release 16)", 3GPP TR 38.840 V2.0.0 (May 2019), 73 pages.

Third Office Action issued in corresponding Chinese Application No. 201980083484.1, mailed Apr. 6, 2023.

First Office Action issued in corresponding Chinese Application No. 201980083484.1, mailed May 19, 2022.

Extended European Search Report issued in corresponding European Application No. 19936119.7, mailed Jun. 1, 2022.

"TP capturing RAN2 agreements and recommendations", Source: CATT, 3GPP TSG-RAN WG2 Meeting#06, R2-1908509, Reno, USA, May 13-17, 2019.

"C-DRX enhancement for UE power saving", Source: Huawei, HiSilicon, 3GPP TSG-RAN2 Meeting#105bis, R2-1904818, Xi'an, China, Apr. 8-12, 2019.

Second Office Action issued in corresponding Chinese Application No. 201980083484.1, mailed Dec. 27, 2022.

* cited by examiner

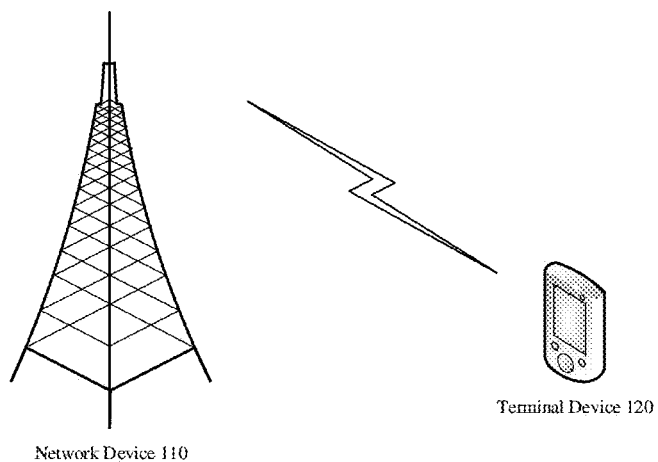
FIG.1
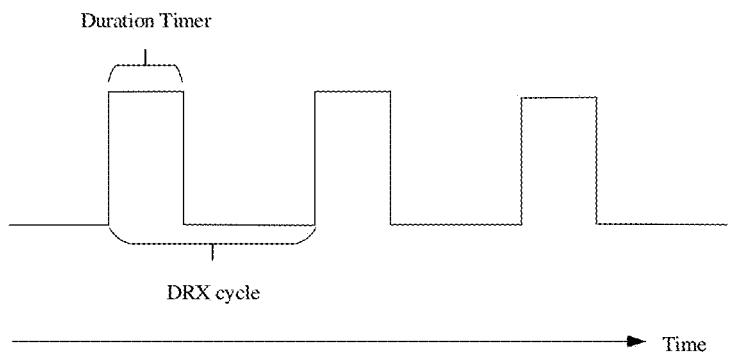
FIG.2
FIG.3

1000

Sending a first power saving signal, the first power saving signal being used to indicate to a terminal device whether to start a duration timer for a first time period ⟵ S1010

Sending a first power saving signal, the first power saving signal being used to trigger a terminal device to start a first timer, and the first power saving signal being further used to indicate to start or not start a duration timer for a running time period of the first timer ⟵ S1110

FIG.11

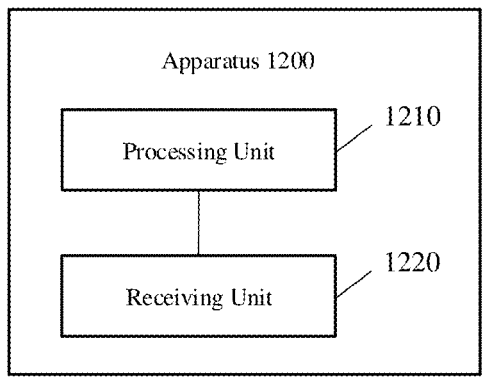

FIG.12

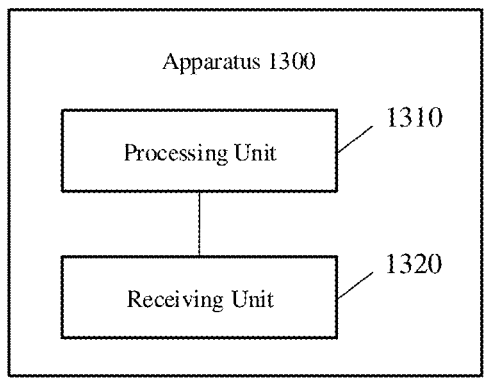

FIG.13

DISCONTINUOUS RECEPTION METHOD AND APPARATUS

CROSS-REFERENCE TO RELATED APPLICATION

This application is a continuation application of International Application No. PCT/CN2019/094638, entitled "DISCONTINUOUS RECEPTION METHOD AND APPARATUS," filed on Jul. 4, 2019, the disclosure of which is incorporated herein by reference in its entirety.

TECHNICAL FIELD

The present disclosure relates to the field of communication, and in particularly, to a discontinuous reception method and apparatus.

BACKGROUND

In order to reduce power consumption, a terminal device usually enters a dormant state when being in an idle state, and will detect a wake up signal (WUS) at regular intervals. If the WUS is detected, the terminal device will enter an awake state from the dormant state to perform related processing, such as synchronization, channel estimation, beam training, etc.

A period during which the terminal device performs the related processing plus a subsequent dormancy period may be referred to as a discontinuous reception (DRX) cycle (DRX cycle). In order to avoid missing information from a network device, the terminal device needs to monitor the WUS during the dormancy period. A period during which the WUS is monitored is called a monitoring occasion. A cycle of the monitoring occasion is usually the same as the DRX cycle, that is, the terminal device needs to monitor the WUS before each DRX cycle, so as to determine whether to enter the awake state in the next DRX cycle. Correspondingly, the network device needs to send the WUS before each DRX cycle.

SUMMARY

The present disclosure provides a discontinuous reception method and apparatus.

In a first aspect, there is provided a discontinuous reception method, including: monitoring a first power saving signal, wherein the first power saving signal is used to indicate whether to start a duration timer for a first time period; and determining whether to start the duration timer according to a detection result of the first power saving signal.

In a second aspect, there is provided another discontinuous reception method, including: monitoring a first power saving signal; when the first power saving signal is detected, starting a first timer; starting or not starting a duration timer for a running time period of the first timer according to a detection result of the first power saving signal.

In a third aspect, there is provided another discontinuous reception method, including: sending a first power saving signal, wherein the first power saving signal is used to indicate to a terminal device whether to start a duration timer for a first time period.

In a fourth aspect, there is provided another discontinuous reception method, including: sending a first power saving signal, wherein the first power saving signal is used to trigger a terminal device to start a first timer, and the first power saving signal is also used to indicate to start or not start a duration timer for a running time period of the first timer.

In a fifth aspect, there is provided a discontinuous reception apparatus, configured to perform the method in the first aspect or the second aspect described above. Specifically, the apparatus includes functional modules configured to perform the method in the first aspect or the second aspect.

In a sixth aspect, there is provided another discontinuous reception apparatus, configured to perform the method in the third aspect or the fourth aspect described above. Specifically, the apparatus includes functional modules configured to perform the method in the third aspect or the fourth aspect.

In a seventh aspect, there is provided a discontinuous reception device, including a processor and a memory. The memory is configured to store a computer program, and the processor is configured to call and run the computer program stored in the memory to execute the method in the first aspect or the second aspect described above.

In an eighth aspect, there is provided another discontinuous reception device, including a processor and a memory. The memory is configured to store a computer program, and the processor is configured to call and run the computer program stored in the memory to execute the method in the third aspect or the fourth aspect described above.

In a ninth aspect, there is provided a chip, configured to perform the method in the first aspect or the second aspect described above. Specifically, the chip includes: a processor, configured to call and run a computer program from a memory, to cause a device installed with the chip to perform the method in the first aspect or the second aspect described above.

In a tenth aspect, there is provided a chip, configured to perform the method in the third aspect or the fourth aspect described above. Specifically, the chip includes: a processor, configured to call and run a computer program from a memory, to cause a device installed with the chip to perform the method in the third aspect or the fourth aspect described above.

In an eleventh aspect, there is provided a computer-readable storage medium, configured to store a computer program that causes a computer to perform the method in the first aspect or the second aspect described above.

In a twelfth aspect, there is provided a computer-readable storage medium, configured to store a computer program that causes a computer to perform the method in the third aspect or the fourth aspect described above.

In a thirteenth aspect, there is provided a computer program product, including computer program instructions that cause a computer to perform the method in the first aspect or the second aspect described above.

In a fourteenth aspect, there is provided a computer program product, including computer program instructions that cause a computer to perform the method in the third aspect or the fourth aspect described above.

In a fifteenth aspect, there is provided a computer program which, when running on a computer, causes the computer to perform the method in the first aspect or the second aspect described above.

In a sixteenth aspect, there is provided a computer program which, when running on a computer, causes the computer to perform the method in the third aspect or the fourth aspect described above.

BRIEF DESCRIPTION OF THE DRAWINGS

FIG. 1 is a schematic diagram of a communication system applicable to the present disclosure;

FIG. 2 is a schematic diagram of a DRX cycle provided by the present disclosure;

FIG. 3 is a schematic diagram of a discontinuous reception method provided by the present disclosure;

FIG. 10 is a schematic diagram of another discontinuous reception method provided by the present disclosure;

FIG. 11 is a schematic diagram of another discontinuous reception method provided by the present disclosure;

FIG. 12 is a schematic diagram of a discontinuous reception apparatus provided by the present disclosure;

FIG. 13 is a schematic diagram of another discontinuous reception apparatus provided by the present disclosure;

DETAILED DESCRIPTION

Figure 4:
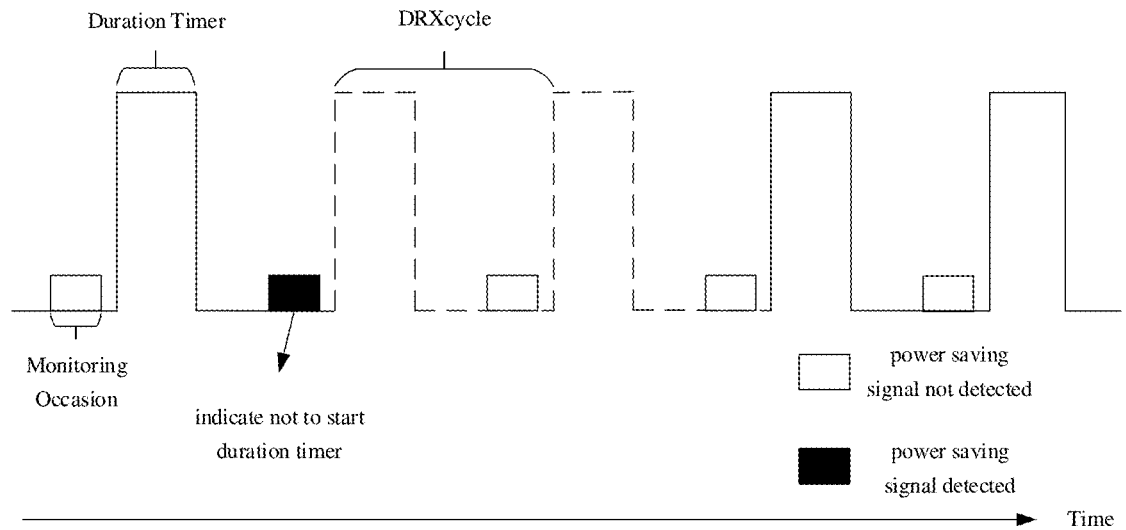
FIG. 4 is a schematic diagram of another discontinuous reception method provided by the present disclosure.

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

First, an application scenario of the present disclosure is introduced. FIG. 1 is a schematic diagram of a communication system applicable to the present disclosure.

The communication system 100 includes a network device 110 and a terminal device 120. The terminal device 120 communicates with the network device 110 through electromagnetic waves.

In the present disclosure, the terminal device 120 may include various handheld devices, vehicle-mounted devices, wearable devices or computing devices with a wireless communication function or other processing devices connected to wireless modems, such as user equipment (UE) defined by the 3rd generation partnership project (3GPP), a mobile station (MS), a soft terminal, a home gateway, a set-top box, etc.

The network device 110 may be a base station defined by 3GPP, for example, a base station (gNB) in a 5G communication system. The network device 110 may also be a non-3GPP access network device, such as an access gateway (AGF). The network device 110 may also be a relay station, an access point, a vehicle-mounted device, a wearable device and other types of devices.

The communication system 100 is only an example, and the communication system applicable to the present disclosure is not limited thereto. For example, the number of network devices and terminal devices included in the communication system 100 may also be other numbers. For the sake of brevity, the terminal devices and network devices below are no longer accompanied by reference numerals.

FIG. 2 is a schematic diagram of a DRX cycle provided by the present disclosure.

When a terminal device determines that it needs to enter an awake state next, the terminal device starts a timer, which may be called a DRX-onDuration timer. During the timing of the DRX-onDuration timer, if the terminal device does not detect data scheduling control information sent by a network device, the terminal device will enter a dormant state when the timing of the DRX-onDuration timer ends until the next DRX-onDuration timer starts. A time period from the start of one DRX-onDuration timer to the start of the next DRX-onDuration timer may be referred to as a DRX cycle.

It should be noted that when the timing of the DRX-onDuration timer ends, the terminal device does not necessarily enter the dormant state. For example, the terminal device in a connected state may continuously attempt to receive a physical downlink control channel (PDCCH) when it is in the awake state. Once the terminal device receives downlink control information (DCI) carried by the PDCCH, it may start or restart a DRX-inactivity timer. When the timing of the DRX-inactivity timer ends, the terminal device enters the dormant state if there is no other timer running to keep the terminal device in the awake state.

In addition, there are some other timers, for example, a downlink HARQ round trip time timer (HARQ-RTT-TimerDL), a DRX downlink retransmission timer (DRX-RetransmissionTimerDL) and a DRX uplink retransmission timer (DRX-RetransmissionTimerUL), etc., which make the terminal device wake up from the dormant state of the DRX cycle, or make the terminal device enter the dormant state from the awake state of the DRX cycle.

The discontinuous reception method provided by the present disclosure will be described below. As shown in FIG. 3, the method 300 includes the following.

In S310, a first power saving signal is monitored, where the first power saving signal is used to indicate whether to start a duration timer for a first time period.

In the present disclosure, the power saving signal may be a WUS or a go-to-sleep signal (GTS). In addition, words such as "first" and "second" are only used to distinguish different elements. For example, the first power saving signal and the second power saving signal are two different power saving signals, and beyond that, there are no other limitations.

In S320, it is determined whether to start the duration timer according to a detection result of the first power saving signal.

The terminal device may monitor the first power saving signal in a monitoring occasion, and the monitoring occasion is within a time period configured by a network before a start time of the duration timer.

If the terminal device detects the first power saving signal, it may start or not start the duration timer according to content indicated by the first power saving signal; and if the terminal device does not detect the first power saving signal, it may start or not start the duration timer according to a preset or default scheme or previously received information.

The first time period is, for example, n DRX cycles, where n is a positive integer greater than or equal to 1. When n is greater than 1, the network device can control, by sending the power saving signal, the terminal device to start or not to start the duration timer for multiple DRX cycles, thereby reducing information overhead of the network device. Optionally, the first power saving signal includes explicit information (for example, a dedicated field) or implicit information (for example, a specific state of a field) indicating the first time period.

The first time period being n DRX cycles is an example for illustration. The duration of the first time period is not limited in the present disclosure, and it may be an absolute duration, such as n milliseconds (ms) or n slots.

As an optional implementation, when the terminal device executes the S320, the terminal device also needs to consider a time period where a monitoring occasion of the first power saving signal is located.

If the network device has indicated to start or not to start the duration timer for the DRX cycle subsequent to the monitoring occasion, the terminal device may perform the S320 in the following manner.

For example, the monitoring occasion of the first power saving signal is within a third time period, and the starting or non-starting of the duration timer for the third time period has been determined.

When the first power saving signal is not detected, the duration timer is started in a remaining time period according to the starting of the duration timer for the third time period; or when the first power saving signal is not detected, the duration timer is not started in the remaining time period according to the non-starting of the duration timer for the third time period.

The above-mentioned remaining time period is a time period subsequent to the monitoring occasion of the first power saving signal within the third time period.

When the first power saving signal is detected, the terminal device does not need to consider the time period where the monitoring occasion of the first power saving signal is located, and starts or does not start the duration timer for the first time period according to the first power saving signal.

If the terminal device detects a second power saving signal within the first time period, it starts or does not start the duration timer for a second time period according to the second power saving signal. A duration of the second time period can be equal to the duration of the first time period. When the second power saving signal indicates to start the duration timer, the effect of this solution is equivalent to that the terminal device restarts the timer indicated by the first power saving signal according to the second power saving signal.

A state of the duration timer within the third time period includes a started state and an un-started state. The terminal device can determine the state of the duration timer within the third time period according to the detection result in the previous monitoring occasion (a monitoring occasion before the monitoring occasion of the first power saving signal).

For example, if the terminal device detects the power saving signal in the previous monitoring occasion, the terminal device may start the duration timer for the third time period according to indication of the power saving signal.

Subsequently, if the terminal device detects the first power saving signal, the terminal device starts or does not start the duration timer for the first time period according to the indication of the first power saving signal without executing the command of the power saving signal in the previous monitoring occasion. If the terminal device does not detect the first power saving signal, the terminal device needs to follow the command of the power saving signal in the previous monitoring occasion and during the remaining time period of the third time period, continue to execute the command of the power saving signal in the previous monitoring occasion.

Optionally, the terminal device may also determine to start the duration timer for the third time period according to the power saving signal being not detected in the previous monitoring occasion.

It should be noted that in the present disclosure, that the terminal device does not detect the power saving signal includes the following cases: a terminal device A detects a power saving signal which is used to indicate to a terminal device B to start or not to start the duration timer in the next time period, that is, this power saving signal is a power saving signal that can be received by a group of terminal devices. In this case, the terminal device A determines that the power saving signal is not detected.

In addition, when the terminal device detects the first power saving signal, it starts or does not start the duration timer according to the indication of the first power saving signal without considering whether the starting or non-starting of the duration timer for the time period subsequent to the monitoring occasion of the first power saving signal has been indicated by other power saving signals or not.

If it is detected that the monitoring occasion of the first power saving signal is not within the time period indicated by any power saving signal, that is, the terminal device cannot determine whether to start or not to start the duration timer after the monitoring occasion of the first power saving signal, the terminal device can execute the S320 in the following preset and/or default manner.

When the first power saving signal is not detected, the duration timer is started for the preset time period; or, when the first power saving signal is not detected, the duration timer is not started for the preset time period.

The preset time period may be configured by the network device, for example, it may be the next DRX cycle adjacent to the monitoring occasion of the first power saving signal. The preset time period may also be specified by a communication protocol in advance, that is, the next DRX cycle adjacent to the monitoring occasion of the first power saving signal.

Hereinafter, the discontinuous reception method provided by the present disclosure will be described in detail with reference to FIGS. 4 to 7.

As shown in FIG. 4, the terminal device monitors the power saving signal in a monitoring occasion before each DRX cycle. A cycle of the monitoring occasion is the same as the DRX cycle, or the cycle of the monitoring occasion can be based on configuration by the network, and can be multiple DRX cycles. The example here is only a case where the cycle of the monitoring occasion is the same as the DRX cycle. The power saving signal is not detected by the terminal device in the first monitoring occasion, and the duration timer in the next DRX cycle immediately after the first monitoring occasion is not indicated by any power saving signal to be turned on or off, and thus the terminal device starts the duration timer for the next DRX cycle according to the power saving signal being not detected, as shown by the solid line in FIG. 4.

Subsequently, the terminal device detects the first power saving signal in a second monitoring occasion, and the terminal device does not start the duration timer for the next 2 DRX cycles according to the indication of the first power saving signal, as shown by the dashed line in FIG. 4.

Subsequently, the terminal device does not start the duration timer in a first DRX cycle of the above-mentioned 2

DRX cycles, and continues to detect the second power saving signal in the monitoring occasion within the above-mentioned 2 DRX cycles.

If the terminal device does not detect the second power saving signal in the first monitoring occasion of the above-mentioned 2 DRX cycles, the terminal device does not start the duration timer for a second DRX cycle of the above-mentioned 2 DRX cycles according to the indication of the first power saving signal.

Figure 5:
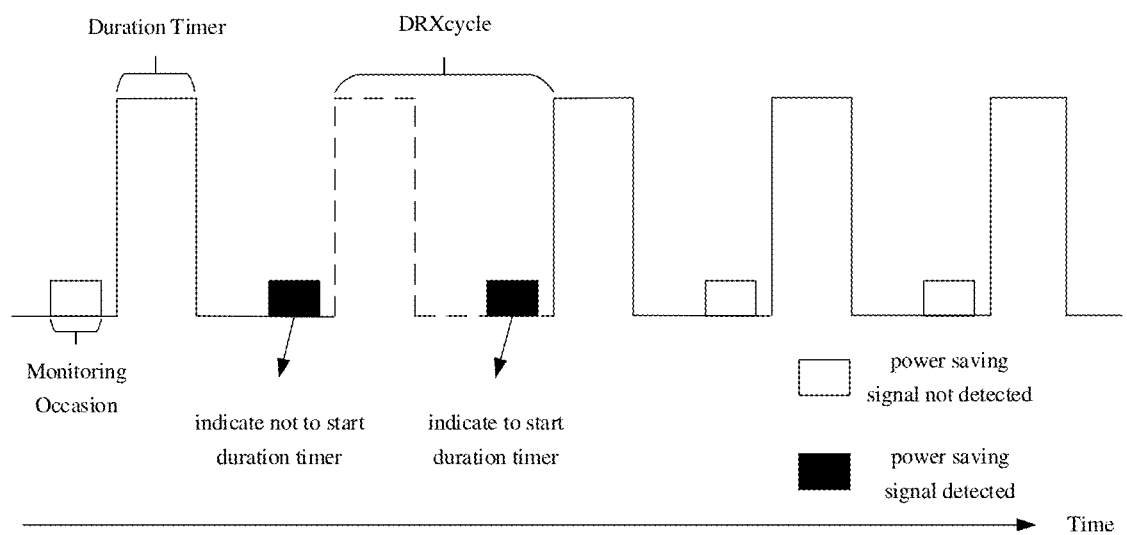
FIG. 5 is a schematic diagram of another discontinuous reception method provided by the present disclosure.

If the terminal device detects the second power saving signal in the first monitoring occasion within the above-mentioned 2 DRX cycles, and the second power saving signal indicates to start the duration timer for the next 3 DRX cycles, the terminal device starts the duration timer for the next 3 DRX cycles according to the indication of the second power saving signal, as shown in FIG. 5. If the network device has urgent data that needs to be transmitted, it can awake the terminal device according to this scheme. Therefore, with this scheme, the network device can complete the transmission of the urgent data while reducing the signaling overhead.

Figure 6:
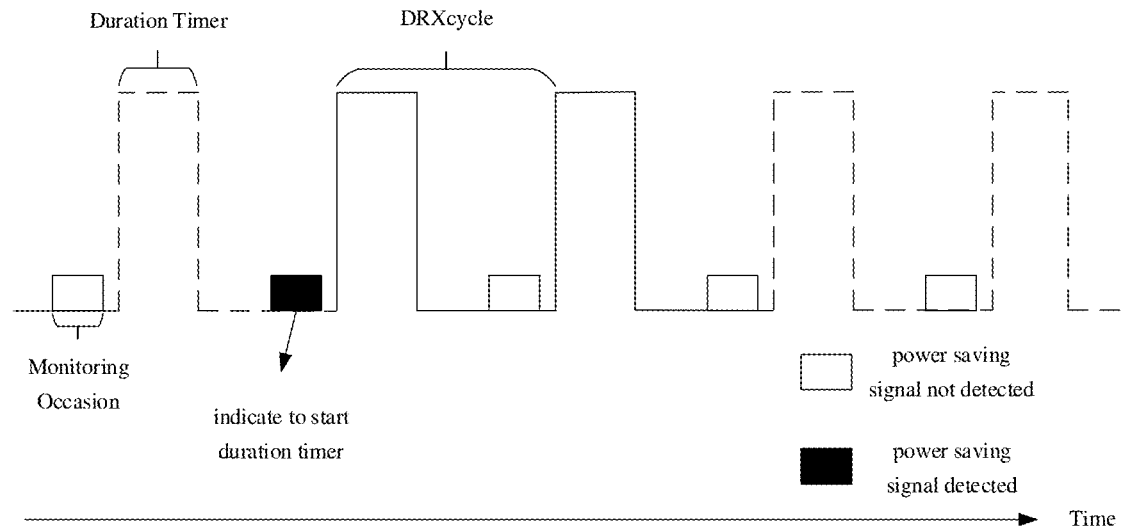
FIG. 6 is a schematic diagram of another discontinuous reception method provided by the present disclosure.

As shown in FIG. 6, the terminal device monitors the power saving signal in a monitoring occasion before each DRX cycle. A cycle of the monitoring occasion is the same as the DRX cycle, or the cycle of the monitoring occasion can be based on configuration by the network and can be multiple DRX cycles. The example here is only a case where the cycle of the monitoring occasion is the same as the DRX cycle. The terminal device does not detect the power saving signal in the first monitoring occasion, and the duration timer in the immediately next DRX cycle is not indicated by any power saving signal to be turned on or off, and thus the terminal device does not start the duration timer for the first DRX cycle according to the power saving signal being not detected, as shown by the dotted line in FIG. 6.

Subsequently, the terminal device detects the first power saving signal in a second monitoring occasion, and the terminal device starts the duration timer for the next 2 DRX cycles according to the indication of the first power saving signal, as shown by the solid line in FIG. 6.

Subsequently, the terminal device starts the duration timer for a first DRX cycle of the above-mentioned 2 DRX cycles, and continues to detect the second power saving signal in the monitoring occasion within the above-mentioned 2 DRX cycles.

If the terminal device does not detect the second power saving signal in the first monitoring occasion of the above-mentioned 2 DRX cycles, the terminal device starts the duration timer for a second DRX cycle of the above-mentioned 2 DRX cycles according to the indication of the first power saving signal.

Figure 7:
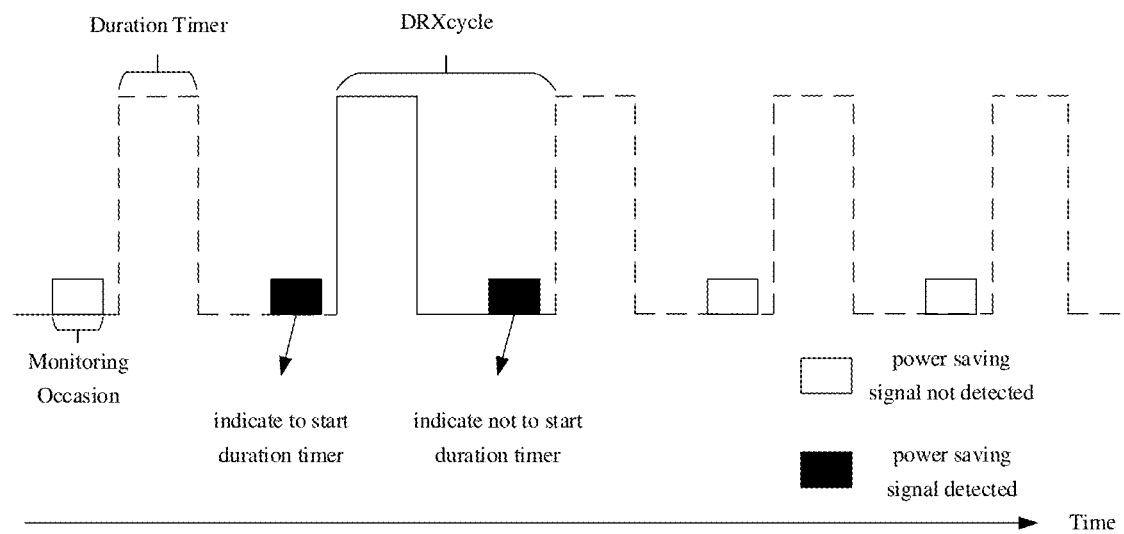
FIG. 7 is a schematic diagram of another discontinuous reception method provided by the present disclosure.

If the terminal device detects the second power saving signal in the first monitoring occasion within the above-mentioned 2 DRX cycles, and the second power saving signal indicates not to start the duration timer for the next 3 DRX cycles, the terminal device does not start the duration timer for the next 3 DRX cycles according to the indication of the second power saving signal. As shown in FIG. 7, if the network device determines that there is no data transmission for a certain time period, it can make the terminal device be dormant according to this scheme. Therefore, with this scheme, the network device can reduce the power consumption of the terminal device while reducing the signaling overhead.

Figure 8:
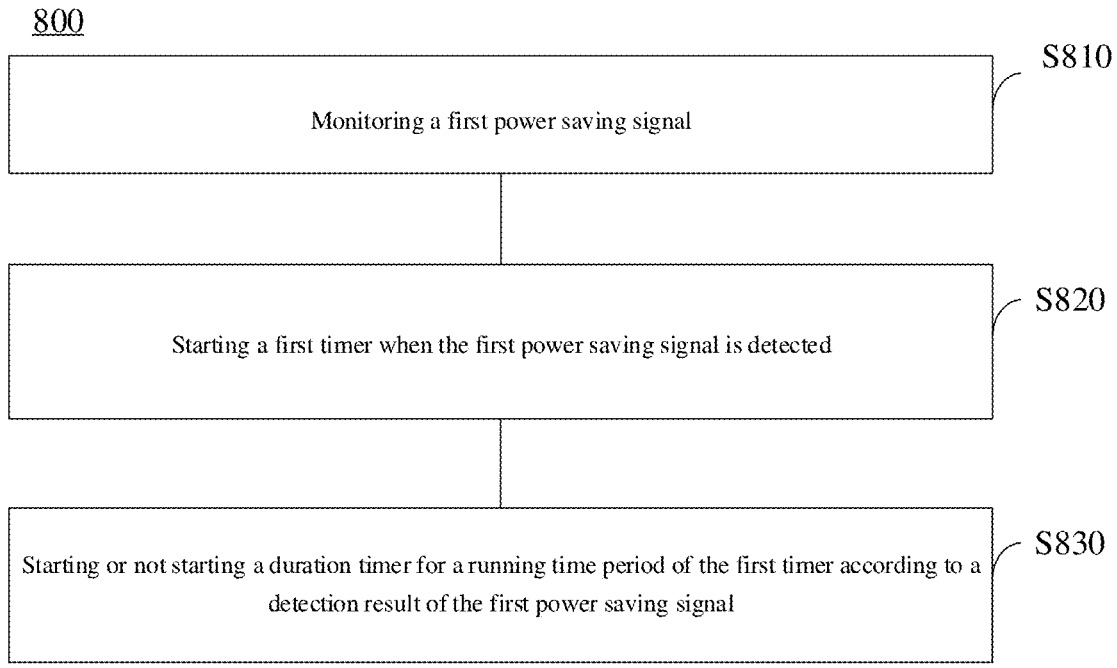
FIG. 8 is a schematic diagram of another discontinuous reception method provided by the present disclosure.

Another discontinuous reception method provided by the present disclosure is described below. As shown in FIG. 8, the method 800 includes the following.

In S810, a first power saving signal is monitored.

In S820, when the first power saving signal is detected, a first timer is started.

In S830, a duration timer is started or is not started for a running time period of the first timer according to a detection result of the first power saving signal.

The network device may configure a duration of the first timer through a radio resource control (RRC) message. Behaviors of the first timer may be determined according to the detection result of the power saving signal.

When the terminal device detects the first power saving signal, the terminal device can start or restart the first timer, and start or not start the duration timer for the running time period of the first timer according to the indication of the first power saving signal. For example, the network device sends the first power saving signal to a group of terminal devices to indicate to the terminal device A in the multiple terminal devices to start the duration timer. If the terminal device A detects the first power saving signal, the terminal device A starts the first timer, and starts the duration timer for each DRX cycle within the duration of the first timer; and if the terminal device B in the same group as the terminal device A detects the first power saving signal, the terminal device B starts the first timer, and does not start the duration timer.

When the terminal device does not detect the first power saving signal, the terminal device may not start the first timer. That the terminal device does not detect the first power saving signal includes that the terminal device detects the power saving signal sent by the network device to other terminal devices, but the power saving signal does not indicate to the terminal to start or not to start the duration timer.

The above solution enables the terminal device to start or not to start the duration timer according to the first power saving signal, which reduces the power consumption of the terminal device. In addition, when the duration of the first timer exceeds the duration of one DRX cycle, the above solution enables the network device to control multiple DRX cycles by sending one message, which reduces the signaling overhead of the network device.

As an optional implementation, the method 800 further includes: monitoring a second power saving signal; and when the second power saving signal is detected within the running time period of the first timer, restarting the first timer.

In the method 800, the second power saving signal is used to trigger the terminal device to restart the first timer. When the network device determines that there is data transmission in a next time period, the network device can trigger the terminal device to restart the first timer by sending the second power saving signal, and indicate to the terminal device to start the duration timer and receive the data through the second power saving signal. When the network device determines that there is no data transmission in the next time period, the network device can trigger the terminal device to restart the first timer by sending the second power saving signal, and indicate to the terminal device not to start the duration timing through the second power saving signal. This solution can flexibly adjust the dormancy time and the awake time of the terminal device.

As an optional implementation, the method 800 further includes: monitoring a third power saving signal; and when a monitoring occasion of the third power saving signal is outside the running time period of the first timer, determining whether to start the duration timer according to a detection result of the third power saving signal.

After the first timer expires, the terminal device can determine to be dormant or awake according to the power saving signal (i.e., the third power saving signal) indicating whether to start the duration timer, so that the dormancy time and the awake time can be flexibly determined.

Figure 9:
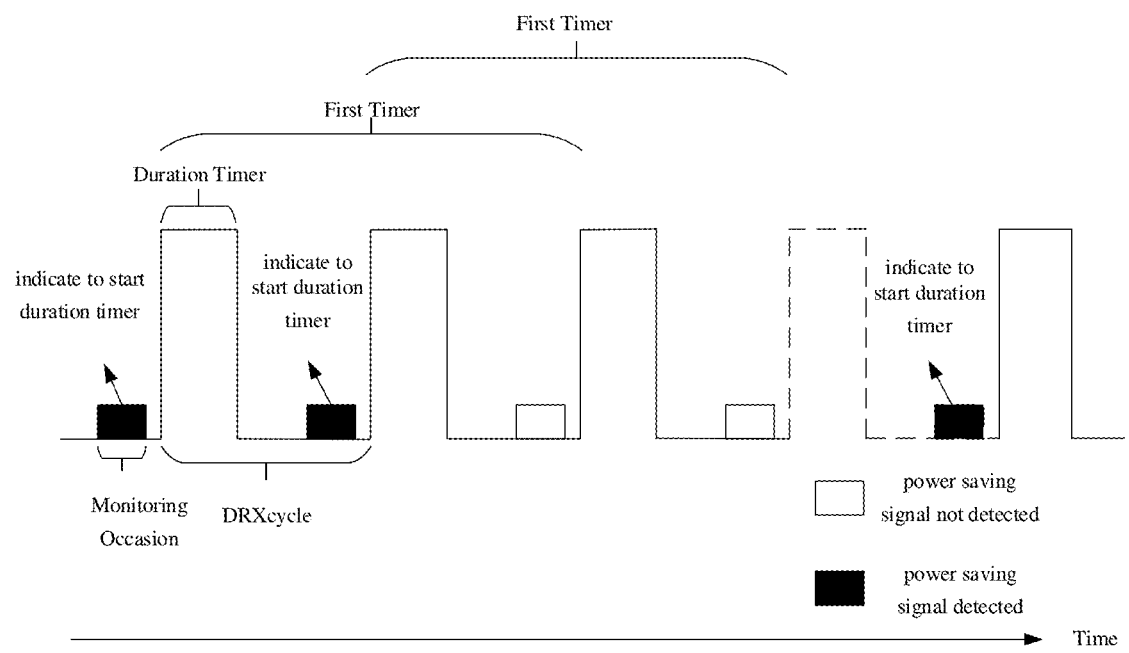
FIG. 9 is a schematic diagram of another discontinuous reception method provided by the present disclosure.

As shown in FIG. 9, when the terminal device detects the first power saving signal and the monitoring occasion of the first power saving signal is not within the running time period of any timer, the terminal device starts the first timer, and the duration of the first timer is 2 DRX cycles. When the terminal device detects the second power saving signal in the monitoring occasion within the first DRX cycle, the terminal device restarts the first timer, and starts the duration timer for the running time period of the restarted first timer.

After the first timer expires, if the terminal device detects the third power saving signal, it determines whether to start the duration timer according to the detection result of the third power saving signal; and if the terminal device does not detect the third power saving signal, it can start or not start the duration timer according to a preset rule.

In the following, the discontinuous reception method provided by the present disclosure is introduced from the perspective of the network device. As shown in FIG. 10, the method 1000 includes the following.

In S1010, a first power saving signal is sent, where the first power saving signal is used to indicate to a terminal device whether to start a duration timer for a first time period.

This step can be performed by the network device or a chip in the network device.

Optionally, the method 1000 further includes:
sending a second power saving signal within the first time period, where the second power saving signal is used to indicate to the terminal device to start or not to start the duration timer for a third time period; or
when a state of the duration timer within the first time period does not need to be changed, not sending the second power saving signal within the first time period.

Optionally, the first time period is n consecutive DRX cycles.

For the specific manner of sending the first power saving signal by the network device and the resulting technical effect, reference may be made to the embodiments corresponding to FIG. 2 to FIG. 7, which will not be described here again for the sake of brevity.

FIG. 11 shows another discontinuous reception method provided by the present disclosure. As shown in FIG. 11, the method 1100 includes the following.

In S1110, a first power saving signal is sent, where the first power saving signal is used to trigger a terminal device to start a first timer, and the first power saving signal is also used to indicate to start or not to start a duration timer for a running time period of the first timer.

Optionally, the method 1110 further includes:
sending a second power saving signal within the running time period of the first timer, where the second power saving signal is used to trigger the terminal device to restart the first timer.

Optionally, the method 1110 further includes:
after the first timer expires, sending a third power saving signal, where the third power saving signal is used to indicate to the terminal device whether to start the duration timer.

For the specific manners of sending the first power saving signal by the network device and the resulting technical effect, reference may be made to the embodiments corresponding to FIG. 8 and FIG. 9, which will not be described here again for the sake of brevity.

The examples of the discontinuous reception method provided by the present disclosure are described in detail above. It can be understood that, in order to realize the above-mentioned functions, a discontinuous reception apparatus includes corresponding hardware structures and/or software modules to execute respective functions. Those skilled in the art should easily realize that, in combination with the examples, units and algorithm steps described in the embodiments disclosed here, the present disclosure may be implemented by hardware or a combination of hardware and computer software. Whether a certain function is performed by hardware or computer software-driven hardware depends on particular applications and design constraint conditions of the technical solutions. A person skilled in the art may use different methods to implement the described functions for each particular application, which should not be considered to go beyond the scope of the disclosure.

In the present disclosure functional units of the discontinuous reception apparatus may be divided according to the foregoing method examples. For example, respective functions may be divided into respective functional units, or two or more functions may be integrated into one processing unit. The integrated unit can be implemented in the form of hardware or software functional unit. It should be noted that the division of units in the present disclosure is illustrative, and is only a kind of logical function division, and there may be other division methods in actual implementations.

FIG. 12 is a schematic structural diagram of a discontinuous reception apparatus provided by the present disclosure. The apparatus 1200 includes a processing unit 1210 and a receiving unit 1220, and the processing unit 1210 can control the receiving unit 1220 to perform a step of monitoring a power saving signal.

The receiving unit 1220 is configured to monitor a first power saving signal, where the first power saving signal is used to indicate whether to start a duration timer for a first time period.

The processing unit 1210 is configured to determine whether to start the duration timer according to a detection result of the first power saving signal.

Optionally, the processing unit 1210 is specifically configured to: when the first power saving signal is detected, start or not start the duration timer for the first time period according to the first power saving signal.

Optionally, the processing unit 1210 is further configured to: when a second power saving signal is detected within the first time period, start or not start the duration timer for a second time period according to the second power saving signal.

Optionally, a duration of the second time period is equal to a duration of the first time period.

Optionally, the processing unit 1210 is further configured to: when a second power saving signal is not detected within the first time period, start the duration timer for a remaining time period according to starting the duration timer for the first time period, or not start the duration timer for the remaining time period according to not starting the duration timer for the first time period, where the remaining time period is a time period subsequent to a monitoring occasion of the second power saving signal within the first time period.

Optionally, it is not determined whether to start or not to start the duration timer for a DRX cycle subsequent to a monitoring occasion of the first power saving signal, and the processing unit 1210 is specifically configured to:

when the first power saving signal is not detected, start the duration timer for a preset time period.

Optionally, it is not determined whether to start or not to start the duration timer for a DRX cycle subsequent to a monitoring occasion of the first power saving signal, and the processing unit 1210 is specifically configured to:

when the first power saving signal is not detected, not start the duration timer for a preset time period.

Optionally, the preset time period is a DRX cycle adjacent to the monitoring occasion of the first power saving signal.

Optionally, the first time period is n consecutive DRX cycles, where n is a positive integer.

FIG. 13 is a schematic structural diagram of a discontinuous reception apparatus provided by the present disclosure. The apparatus 1300 includes a processing unit 1310 and a receiving unit 1320, and the processing unit 1310 can control the receiving unit 1320 to perform a step of monitoring a power saving signal.

The receiving unit 1320 is configured to monitor a first power saving signal.

The processing unit 1310 is configured to start a first timer when the first power saving signal is detected.

The processing unit 1310 is further configured to start or not start a duration timer for a running time period of the first timer according to a detection result of the first power saving signal.

Optionally, the receiving unit 1320 is further configured to monitor a second power saving signal; and the processing unit 1310 is further configured to restart the first timer when the second power saving signal is detected within the running time period of the first timer.

Optionally, the receiving unit 1320 is further configured to monitor a third power saving signal; and the processing unit 1310 is further configured to determine whether to start the duration timer according to a detection result of the third power saving signal when a monitoring occasion of the third power saving signal is outside the running time period of the first timer.

Figure 14:
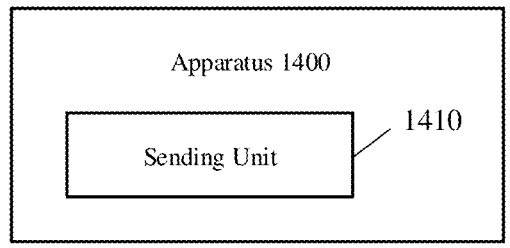
FIG. 14 is a schematic diagram of another discontinuous reception apparatus provided by the present disclosure.

FIG. 14 is a schematic structural diagram of a discontinuous reception apparatus provided by the present disclosure. The apparatus 1400 includes a sending unit 1410.

The sending unit 1410 is configured to send a first power saving signal, where the first power saving signal is used to indicate to a terminal device whether to start a duration timer for a first time period.

Optionally, the sending unit 1410 is further configured to send a second power saving signal within the first time period, where the second power saving signal is used to indicate to the terminal device to start or not to start the duration timer for a second time period; or the apparatus 1410 further includes a processing unit configured to: not send the second power saving signal within the first time period when a state of the duration timer within the first time period does not need to be changed.

Optionally, a duration of the second time period is equal to a duration of the first time period.

Optionally, the first time period is n consecutive DRX cycles.

Optionally, the sending unit 1410 is further configured to configure the first time period before sending the first power saving signal; or indicate the first time period through the first power saving signal.

Figure 15:
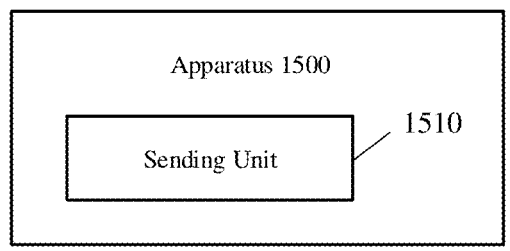
FIG. 15 is a schematic diagram of another discontinuous reception apparatus provided by the present disclosure.

FIG. 15 is a schematic structural diagram of a discontinuous reception apparatus provided by the present disclosure. The apparatus 1500 includes a sending unit 1510.

The sending unit 1510 is configured to send a first power saving signal, where the first power saving signal is used to trigger a terminal device to start a first timer, and the first power saving signal is also used to indicate to start or not to start a duration timer for a running time period of the first timer.

Optionally, the sending unit 1510 is further configured to:
send a second power saving signal within the running time period of the first timer, where the second power saving signal is used to indicate to the terminal device to restart the first timer.

Optionally, the sending unit 1510 is further configured to:
send a third power saving signal after the first timer expires, where the third power saving signal is used to indicate to the terminal device whether to start the duration timer.

Figure 16:
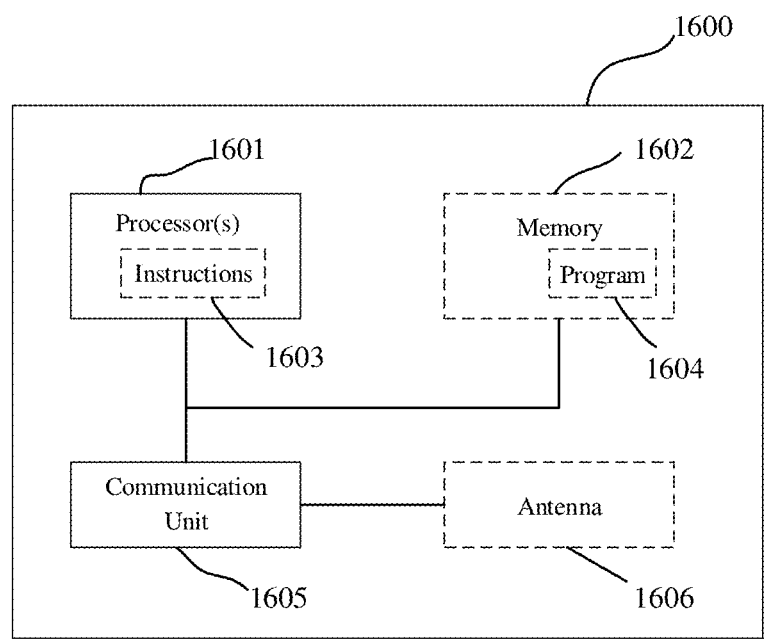
FIG. 16 is a schematic diagram of a discontinuous reception device provided by the present disclosure.

FIG. 16 is a schematic structural diagram of a discontinuous reception device provided by the present disclosure. The dashed line in FIG. 16 indicates that the unit or the module is optional. A device 1600 may be configured to implement the method described in the above method implementations. The device 1600 may be a terminal device or a network device or a chip.

The device 1600 includes one or more processors 1601, the one or more processors 1601 may support the device 1600 to implement the methods in the method implementations corresponding to FIGS. 2 to 11. The processor 1601 may be a general purpose processor or a special purpose processor. For example, the processor 1601 may be a central processing unit (CPU). The CPU may be configured to control the device 1600, execute software programs, and process data of the software programs. The device 1600 may further include a communication unit 1605 configured to implement input (reception) and output (transmission) of signals.

For example, the device 1600 may be a chip, and the communication unit 1605 may be an input and/or output circuit of the chip, or the communication unit 1605 may be a communication interface of the chip, which may be a component of a terminal device or a network device or other wireless communication devices.

For another example, the device 1600 may be a terminal device or a network device, and the communication unit 1605 may be a transceiver of the terminal device or the network device, or the communication unit 1605 may be a transceiving circuit of the terminal device or the network device.

The device 1600 may include one or more memories 1602 on which a program 1604 is stored, and the program 1604 may be executed by the processor 1601 to generate an instruction 1603, enabling the processor 1601 to perform the methods described in the above method implementations according to the instruction 1603. Optionally, data may also be stored in the memory 1602. Optionally, the processor 1601 may also read data stored in the memory 1602, and the data may be stored at a same storage address as the program 1604, or at a different storage address from the program 1604.

The processor 1601 and the memory 1602 may be arranged separately or integrated together, for example, they may be integrated on a single board of a network device or a system on chip (SOC) of a terminal device.

The device 1600 may also include an antenna 1606. The communication unit 1605 is configured to implement the transceiving function of the device 1600 by the antenna 1606.

For the specific manners in which the processor 1601 performs the discontinuous reception method, reference can be made to the related description in the method implementations.

It should be understood that each step of the foregoing method implementations may be implemented by an integrated logic circuit in a form of hardware in the processor 1601 or instructions in a form of software. The processor 1601 may be a CPU, a digital signal processor (DSP), an application specific integrated circuit (ASIC), a field programmable gate array (FPGA), or another programmable logic device, such as a discrete gate, a transistor logic device, or a discrete hardware component.

The present disclosure further provides a computer program product which, when being executed by the processor 1601, carries out the method described in any of the method implementations in the present disclosure.

The computer program product may be stored in the memory 1602, for example, the computer program may be a program 1604, which is finally converted into an executable object file that can be executed by the processor 1601 after being subjected to processing procedures such as preprocessing, compiling, assembling and linking.

The present disclosure further provides a computer readable storage medium having stored thereon a computer program which, when being executed by a computer, carries out the method described in any method implementation in the present disclosure. The computer program may be a high-level language program or an executable object program.

The computer readable storage medium is, for example, the memory 1602. The memory 1602 may be a volatile memory or non-volatile memory, or the memory 1602 may include both the volatile memory and the non-volatile memory. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. By way of example rather than limitation, a RAM is available in many forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

Those skilled in the art can clearly understand that for the convenience and conciseness of description, for the specific operation processes and technical effects of the above-described devices and apparatus, reference can be made to the corresponding processes and technical effects in the above-mentioned method implementations, which will not be described in detail here.

According to the embodiments provided by the present disclosure, it should be understood that the disclosed systems, apparatuses and methods may be implemented in other ways. For example, some features of the method implementations described above may be ignored or not performed. The apparatus implementations described above are only illustrative, and the division of the units is only a logical function division, and there may be other division manners in actual implementations. For example, multiple units or components may be combined or integrated into another system. In addition, the coupling between units or components can be direct coupling or indirect coupling, which includes electrical, mechanical or other forms of connection.

It should be understood that in various implementations of the present disclosure, the serial numbers of the foregoing processes do not mean a performing order. The performing order of the processes should be determined according to functions and internal logics of the processes, and should not impose any limitation on implementation processes of the embodiments of the present disclosure.

In addition, the terms "system" and "network" are often used interchangeably herein. The term "and/or" used here is merely an association relation describing associated objects, indicating that there may be three relations, for example, A and/or B may indicate three cases where A exists alone, A and B exist concurrently, and B exists alone. In addition, the character "/" used herein generally indicates that the related objects before and after this character are in an "or" relationship.

In general, those described above are only preferred implementations of the present disclosure, which are not intended to limit the protection scope of the present disclosure. Any modification, equivalent substitution, improvement, etc. made within the spirit and principle of the present disclosure shall be included in the protection scope of the present disclosure.

What is claimed is:

1. A method for discontinuous reception, comprising:
   monitoring a first power saving signal, wherein the first power saving signal is used to indicate whether to start a duration timer for a first time period and the first power saving signal comprises information indicating the first time period; and
   in response to that the first power saving signal is detected, starting or not starting the duration timer for the first time period according to the first power saving signal, wherein the first time period is n consecutive DRX cycles, n being a positive integer greater than or equal to 1,
   wherein it is not detected any other signal that indicates whether to start or not to start the duration timer for a discontinuous reception (DRX) cycle subsequent to a monitoring occasion of the first power saving signal, the determining whether to start the duration timer according to the detection result of the first power saving signal comprises:
   in response to that the first power saving signal is not detected in the monitoring occasion of the first power saving signal, starting the duration timer for a preset time period, wherein the preset time period is one DRX cycle adjacent to the monitoring occasion of the first power saving signal.

2. The method according to claim 1, further comprising: starting or not starting the duration timer for a second time period according to a second power saving signal when the second power saving signal is detected within the first time period.

3. The method according to claim 2, wherein a duration of the second time period is equal to a duration of the first time period.

4. The method according to claim 1, further comprising:
   when a second power saving signal is not detected within the first time period, starting the duration timer for a remaining time period according to starting the duration timer within the first time period, or not starting the duration timer for the remaining time period according to not starting the duration timer within the first time period, wherein the remaining time period is a time period subsequent to a monitoring occasion of the second power saving signal within the first time period.

5. An apparatus for discontinuous reception, comprising:
   a transceiver;
   a processor; and
   a memory configured to store a computer program executable by the processor, wherein the transceiver is configured to monitor a first power saving signal, wherein the first power saving signal is used to indicate whether to start a duration timer for a first time period and the first power saving signal comprises information indicating the first time period; and the processor is configured to start or not start the duration timer for the first time period according to the first power saving signal in response to that the first power saving signal is detected, wherein the first time period is n consecutive DRX cycles, n being a positive integer greater than or equal to 1, wherein it is not detected any other signal that indicates whether to start or not to start the duration timer for a discontinuous reception (DRX) cycle subsequent to a monitoring occasion of the first power saving signal, the processor is specifically configured to:

in response to that the first power saving signal is not detected in the monitoring occasion of the first power saving signal, start the duration timer for a preset time period, wherein the preset time period is one DRX cycle adjacent to the monitoring occasion of the first power saving signal.

6. The apparatus according to claim 5, wherein the processor is further configured to:

start or not start the duration timer for a second time period according to a second power saving signal when the second power saving signal is detected within the first time period.

7. The apparatus according to claim 6, wherein a duration of the second time period is equal to a duration of the first time period.

8. The apparatus according to claim 5, wherein the processor is further configured to:

when a second power saving signal is not detected within the first time period, start the duration timer for a remaining time period according to starting the duration timer within the first time period, or not start the duration timer for the remaining time period according to not starting the duration timer within the first time period, wherein the remaining time period is a time period subsequent to a monitoring occasion of the second power saving signal within the first time period.

\* \* \* \* \*